United States Patent [19]
Gens

[11] 4,235,749
[45] Nov. 25, 1980

[54] AMMONIA SYNTHESIS CATALYSTS AND PROCESS OF MAKING AND USING THEM
[75] Inventor: Theodore A. Gens, Lake Zurich, Ill.
[73] Assignee: Indianapolis Center for Advanced Research, Indianapolis, Ind.
[21] Appl. No.: 76,288
[22] Filed: Sep. 17, 1979

Related U.S. Application Data
[63] Continuation-in-part of Ser. No. 960,941, Nov. 15, 1978, abandoned.

[51] Int. Cl.$^3$ .................. B01J 23/78; B01J 27/20
[52] U.S. Cl. ........................... 252/443; 252/473; 252/474; 423/363
[58] Field of Search .............. 252/443, 473, 474; 423/363

[56] References Cited
U.S. PATENT DOCUMENTS

| | | | |
|---|---|---|---|
| 1,667,323 | 4/1928 | Larson | 423/363 |
| 2,944,988 | 7/1960 | Sauter et al. | 252/443 |
| 3,658,721 | 4/1972 | Tamaru et al. | 423/363 |
| 3,660,028 | 5/1972 | Tamaru et al. | 423/363 |
| 3,770,658 | 11/1973 | Ozaki et al. | 252/443 |
| 3,830,753 | 8/1974 | Ichikawa et al. | 252/441 |

Primary Examiner—W. J. Shine
Attorney, Agent, or Firm—Jenkins, Coffey, Hyland, Badger & Conard

[57] ABSTRACT

The activity of conventional iron-based ammonia synthesis catalysts is enhanced by supplying alkali to the finished catalyst by vapor transpiration, either during preparation of the catalyst or during its use in synthesis operation, or during both. The catalyst used may contain one or more conventional promoters, including alkali embodied in the catalyst during its manufacture. The vapor transpiration provides increased effective alkali at the catalyst surfaces in the form of a inorganic compound, such as the hydroxide or carbonate or hydride. It avoids the problem of loss of surface area which would result from adding more alkali during manufacture of the catalyst. Vapor transpiration conditions, especially the relative temperatures of the vaporization chamber and hence the alkali vapor partial pressure in the catalyst chamber, are controlled to achieve an effective deposition while avoiding pore blockage or reduction of surface area.

34 Claims, 3 Drawing Figures

AMMONIA SYNTHESIS CATALYSTS AND PROCESS OF MAKING AND USING THEM

This is a continuation-in-part of Application Ser. No. 960,941, filed Nov. 15, 1978, now abandoned under the same title.

This invention concerns improved catalysts for the syntheses of ammonia from hydrogen and nitrogen and processes for making the improved catalysts and for synthesizing ammonia with them.

Commercially successful catalysts for producing ammonia from hydrogen and nitrogen were first developed by Haber and Bosch prior to World War I. Catalysts currently in use still resemble closely those made by the early developers. They are made by fusing magnetite, an iron oxide, along with various promoters in smaller quantities, and by cooling, grinding, and sizing the resulting melt. Prior to use, the iron oxide is reduced to metallic iron. The promoters are of two types: (a) temperature-resistant acidic or amphoteric oxides, such as alumina, and (b) alkaline or alkaline earth oxides, such as sodium or potassium oxide.

It is well recognized that a major function of the amphoteric or acidic oxide promoters is to increase the surface area of the resultant iron catalyst by approximately an order of magnitude above that of iron made from reduced iron oxide which does not contain such a promoter.

The function of the alkaline oxide promoters is more complex. These promoters increase the intrinsic activity of the iron surface, but they are used in limited amounts because they also cause a decrease in the catalyst surface area in the normal manufacturing process. See: Catalyst Handbook, Springer-Verlag, New York Inc., 1970, page 135; K. S. Love and S. Brunauer, J. Amer. Chem. Soc., Vol. 64, pages 745–751, 1942. Therefore, there is an optimum concentration of alkaline oxide promoter, usually about 1 wt. percent, at which the maximum catalyst activity is obtained.

The objective of the present invention is to furnish additional alkali after the catalyst manufacturing process is completed and the open pore structure is permanently established. It is a further objective to furnish this additional alkali directly to the surface of the substrate catalyst in order to fully utilize the promotional properties of the alkali. Alkali added in this manner, in quantities small enough so that pore blockage is avoided, will greatly increase the activity of the catalyst. The problem of decreased surface area and activity, which would have occurred if more alkali were added during the manufacturing process, is thereby circumvented. The quantity of alkali needed is very small, since all of the alkali is introduced onto the surface where ammonia formation is catalysed.

The results of the present invention are consistent with the view that the mechanism whereby the alkali promoter enhances catalytic activity involves a decrease in the electron work function. The chemisorption of nitrogen involves a negative charge transfer in the direction of the nitrogen atoms, which is facilitated by the presence of alkaline compounds. According to this mechanistic view, the promoter action should not be affected to any large extent by the nature of the chemical bonding within the alkaline compounds. Consistent with this view, various different alkaline compounds may be used to produce the promoter effect of the present invention.

The catalysts of the present invention differ very significantly from those disclosed in U.S. Pat. Nos. 3,658,721; 3,660,028; and 3,770,658. U.S. Pat. No. 3,658,721 discloses a catalyst comprising a complex of an alkali metal or organoalkali metal and a transition metal (e.g., Fe.) phthalacyanine or porphyrin. U.S. Pat. No. 3,660,028 employs as a catalyst a complex of alkali metal or organo-alkali metal with graphite.

U.S. Pat. No. 3,770,658 combines a transition metal (e.g., Fe.) with an alkali metal in metallic state, with or without a third component (e.g., alumina) which further improves the activity. One disclosed method of adding the alkali metal in metallic state is by adsorption from an inert gas. This deposits the alkali metal "in metallic state" instead of a compound as here contemplated; and requires use of an inert gas, where the present invention uses a gas containing a reactive component. The present invention can and preferably does use synthesis gas, and can supply alkali to the catalyst either during reduction of an iron catalyst from iron oxide to iron or during ammonia synthesis production. Also, the amount of alkali permitted and preferably used in U.S. Pat. No. 3,770,658 is much greater than in my invention; and the addition of alkali is an integral part of the preparation of the catalyst, whereas in my invention the alkali is introduced after the normal catalyst manufacture has been completed and the substrate is already a preformed porous body and an active catalyst.

In accordance with the present invention, a substrate of a conventional iron oxide synthesis catalyst, preferably with known promoters, after its conventional manufacture is finished, is treated to improve its activity. The improvement is obtained by providing at the active surface of the catalyst, as a coating at such surface, a small quantity of alkali compound, produced by vapor deposition of an alkali metal compound at such surface from gas passing over the catalyst either during a preliminary step or during its synthesis operation or during both. The improvement step can be added to existing ammonia synthesis installations.

The catalyst used may be any of various known or commercial iron-based catalysts, prepared in the usual way so as to form a porous material with large surface area. The surface area is desirably at least about 5.0 $m^2/g$ and preferably at least 10.0 $m^2/g$. The substrate catalyst also preferably contains one or more known promoters, including an alkali metal or alkaline-earth metal oxide in an amount less than about 1 wt. percent of the catalyst weight. A preferred commercial catalyst is that available on the market as "Katalco 35-4" catalyst from Katalco Corporation, Oak Brook, Ill. 60521.

The alkali metal used is conveniently sodium, but may also be potassium, rubidium, or cesium. The alkali compound used to coat the surface may be alkali hydride, carbonate, or hydroxide, or a mixture of these compounds. The selection of alkali compound or compounds to be used in the coat and method of application can be made on the basis of suitability for a particular plant from methods illustrated below. The alkali hydroxides and carbonates are relatively very stable compounds, and activity caused by them remains constant without any further alkali addition. The hydrides dissociate slowly to volatile metal and hydrogen and must be continuously replenished.

Alkali is introduced in a stream of gas flowing into the catalyst chamber, by pre-treating this gas in a heated pre-treatment chamber containing alkali metal or alkali hydride. Alkali in the pre-treatment chamber is most conveniently introduced as the metal and is preferably dispersed over a support having a large surface area. In experiments described here, fine nickel powder is used as the support because it is catalytically inactive and cannot contribute ammonia which would interfere with activity measurements when synthesis gas is used as the transpiration medium. Densely-packed, fine stainless steel fibers are a preferred support for the alkali, but cannot be used in conjunction with catalyst activity measurements, when synthesis gas is the transpiration medium, because the fibers themselves become active catalysts when coated with alkali compounds.

The gas used to transpire alkali metal from the pre-treatment chamber to the catalyst chamber may conveniently be synthesis gas (a mixture of three volumes of hydrogen and one volume of nitrogen). It may also be nitrogen alone or an inert gas such as argon, in which case the inert gas is preferably mixed with synthesis gas before it reaches the catalyst. When pure synthesis gas is used, the alkali metal in the pre-treatment chamber reacts with hydrogen in such gas to form alkali hydride. The alkali hydrides are not volatile, but at suitable temperatures of the pretreatment chamber will undergo slow decomposition to volatile alkali metal and hydrogen. The volatilized alkali metal is carried in the synthesis gas to the catalyst chamber, and recombines with hydrogen in the synthesis gas and forms a coat of alkali hydride on the catalyst surface. The thickness of this coat depends upon the alkali content of the gas entering the catalyst chamber and on the temperature and hydrogen partial pressure of the catalyst chamber. Therefore, the thickness of the coat can be controlled by controlling the temperatures of the pre-treatment and catalyst chambers, as discussed further below.

If nitrogen or inert gas is used to transpire alkali, the high vapor pressure of alkali metals, at suitable temperatures of the pre-treatment chamber, makes it possible to use a nitrogen or inert gas stream of small volume relative to the volume of the synthesis gas stream. When nitrogen or inert gas is used for this purpose, either during reduction of the catalyst or for synthesis operation, the nitrogen or inert gas side stream containing the vaporized alkali metal is mixed with the synthesis gas stream before such stream enters the catalyst chamber, and the mixing should be adequate to ensure that the alkali vapor is evenly mixed. The alkali vapor will equilibrate with hydrogen in pure synthesis gas and form a coat of alkali hydride on the catalyst surface.

If water or carbon oxides or mixtures of them are present when the alkali metal is transpired into the catalyst chamber, the alkali metal will react with such water vapor or carbon oxides to form, respectively, alkali hydroxide or alkali carbonate or mixtures of these compounds, and these will coat the catalyst surface. In usual practice, synthesis gas is carefully purified to remove such impurities as water and carbon oxides in order to protect the catalyst from reactions which could decrease the catalyst activity. Therefore, if a hydroxide or carbonate or mixed hydroxide-carbonate coating is desired, it will normally be necessary to add small amounts of the water or carbon oxides to react with the alkali metal. Such additions should be made downstream from the pre-treatment chamber since the alkali or alkali hydride in the pre-treatment chamber will readily react with and remove the water or carbon oxides from the gas stream.

A convenient method for introducing a small amount of water vapor into the synthesis gas in the catalyst chamber to react with transpired alkali metal is to transpire alkali metal into the catalyst chamber simultaneously with reduction of a commercial promoted iron oxide catalyst. Water vapor is a product of the reduction operation. A commercial catalyst is conventionally reduced by passing a large volume of synthesis gas over the catalyst as the temperature is increased slowly from about 350° C. to 500° C. The rate of reduction is kept low in order to avoid high water partial pressures which can damage the reduced portions of the catalyst. The temperature of the pre-treatment chamber where the synthesis gas picks up alkali must be kept well below that of the catalyst chamber to avoid introducing the alkali too rapidly and plugging pores in the catalyst. By way of example, good results have been obtained by maintaining the pre-treatment chamber loaded with sodium (as hydride) at 300° C. and passing the synthesis gas through this chamber during the portion of the reduction cycle between 400° and 500° C., over a five hour period, at 1 atmosphere and a space velocity of 6,000 per hour. The optimum pre-treatment chamber temperature will vary with different reduction cycles, which cycles vary with different commercial catalysts and plant operator preferences.

As additional modifications, a combination of methods can be used to produce a coat of alkali metal compound or compounds of optimum thickness. For example, a coat of alkali hydroxide put on during the promoted iron oxide reduction operation can be supplemented by additional alkali compound added during synthesis operation by one of the other methods discussed above.

The amount of alkali metal compound introduced onto the catalyst measured by weight of the alkali metal should not exceed about one wt. percent of the catalyst weight, and preferably not more than 0.6 wt. percent, but the amount will be influenced by variations in pore size and surface area of commercial catalysts. The amount for Katalco 35-4 commercial catalyst should not exceed 0.8 wt. percent and preferably is about 0.5 wt. percent. Smaller amounts will be effective, as low as 0.01 wt. percent, but to a proportionately lesser degree. Larger amounts lead to pore blockage and loss of activity. The effective and optimum amounts of alkali introduced onto the catalyst can be readily determined by observing the output of ammonia during the synthesis operation. When part or all of the alkali is introduced during synthesis operation, rather than during preparation or reduction of the catalyst, the ammonia output can be readily monitored and the relative temperatures of the vaporization chamber and catalysts reaction chamber regulated to produce optimum synthesis results, as indicated in the following examples.

The quantity of alkali metal transpired from the pre-treatment chamber when nitrogen or inert gas is used as the carrier gas can be estimated readily from the vapor pressures of the alkali metals as a function of temperature, as reported, for example, in Lange's Handbook of Chemistry, Eleventh Edition, page 10–31. Care should be taken to avoid transpiring so much alkali as to plug the catalyst pores, when nitrogen or inert gas is used instead of synthesis gas for transpiring the alkali.

The decomposition behavior of the alkali hydrides as a function of temperature and hydrogen partial pressure in the pure synthesis gas is similar for all the alkali metals, sodium, potassium, rubidium, and cesium. See: A. Herold, Ann. chim. 6, 536 (1951); K. M. Mackay, "Hydrogen Compounds of the Metallic Elements", page 21, E. and F. N. Spon, Ltd., London, 1966.

When synthesis gas is used as the carrier gas, alkali hydride forms in the pre-treatment chamber, as discussed earlier. In this case, the following method is used to estimate the amount of alkali transpired into the catalytic reactor. The alkali metal vapor pressure will be depressed significantly below that which would normally exist above alkali metal because of reaction with the hydrogen:

$$M + \tfrac{1}{2}H_2 \rightleftharpoons MH \qquad (1)$$

The equilibrium constant (K) for this reaction is defined by the formula:

$$K_{Eq.} = [A_{MH}]/A_M(A_{H_2})^{\tfrac{1}{2}}] \qquad (2)$$

where $A_M$ means chemical activity for alkali metal and $A_{MH}$ means chemical activity for alkali metal hydride. With sodium, the equilibrium constant for this reaction is 1.00 (JANAF Thermochemical Tables) at the temperature of interest for ammonia synthesis. In order to estimate the effective activity of the alkali metal in Equation 1, a single phase consisting of metal dissolved in metal hydride is assumed, with the single phase being predominately hydride. It can be seen from available literature (Addison, Pulham, and Roy, J. Chem. Soc., 1964, 4895) that this situation exists for the case of sodium under practical ammonia synthesis conditions. Hence, the usual substitution of "1.00" for the activity of a separate phase is made. Also, since the hydrogen is gaseous, pressure (P) of hydrogen may be substituted for activity (A). Accordingly, Equation (2) yields the formula:

$$A_M = 1/(P_{H_2})^{\tfrac{1}{2}} \qquad (3)$$

which approximates the effective activity of the alkali metal in Equation (1). The calculated alkali metal vapor pressure is calculated from the vapor pressure reported in the literature for the pure metal, by multiplying the reported pressure by the fraction as calculated from Equation (3). It should be realized that this method is a qualitative approximation, necessitated by the absence of reported experimental results for the alkali metal-alkali hydride system.

BRIEF DESCRIPTION OF THE DRAWINGS

The accompanying drawings illustrate the invention and show certain results obtained in Example 4. In such drawings.

Figure 1:
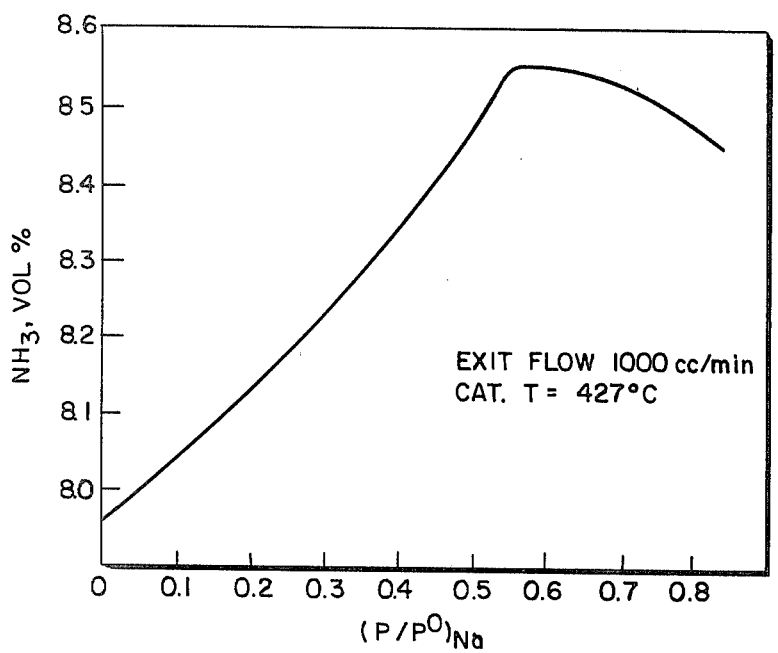
FIG. 1 is a graph in which the production rate in volume percent of $NH_3$ is plotted against increasing sodium partial pressure ratio $(P/P^0)_{Na}$.

The following examples illustrate the invention and are not intended as limitations thereof. The first example illustrates that the promotional effect of alkali is not related to any interaction with other promoters already present in commercial catalysts. The results of Example 1 disagree with the explanation sometimes advanced to explain the promoter capability of alkali in conventional catalysts, that the alkali neutralizes acid sites formed by other promoters (see "Catalysts, Vol. III, Hydrogenation and Dehydrogenation" Ed. by P. Emmett, Reinhold Publishing Company, New York, 1955, page 237).

EXAMPLE 1

Fine iron powder made by the carbonyl iron process, obtained from the GAF Corporation and designated 482-SF, was used as the iron substrate. This iron material is in the form of small, non-porous spheroids, 3 to 4 micrometers in diameter. No reduction of this powder is required because it is iron metal. Measurements made by the BET method yielded a surface area value of 0.066 $m^2/g$. Powder in this form could not be readily used in modern ammonia converters, mainly because the pressure drops across a bed of such fine material would be excessive. For experimental purposes, however, this material offers the advantages that no other promoters are present and that alkali can be introduced by simply adding alkali metal to the bed. Because the bed ebullates gently in upward flowing synthesis gas at usable space velocities, alkali, introduced as metal and converted to metal hydride, quickly becomes evenly spread over the substrate surface. In addition, there are no pores to become clogged. Hence, it is not necessary to use vapor transpiration methods to carefully control the thickness of the alkali hydride coat, as is the case with porous substrates. The experimental results show the activity of the exterior surface, since there is no significant interior porosity.

One gram of this iron powder was loaded into a small, vertical tube reactor, containing a welded porous nickel support plate. After the surface of the particles was thoroughly degassed in a stream of synthesis gas at 400° C., the particles were cooled, the reactor was opened, and 0.03 g Na was introduced as metal onto the particle bed. The reactor was then reheated and 3.5 liters/hr. (STP) of synthesis gas at 50 atmospheres was flowed therethrough to establish ammonia production conditions. The iron powder became coated with sodium hydride as explained above. Catalyst activity was observed by measuring ammonia production, and a maximum catalyst activity of 4.0 vol. percent $NH_3$ was observed. On the basis of the surface area of the nonporous spheroid catalyst, the specific activity of the iron-sodium hydride catalyst was 0.2 liters $NH_3/m^2/hr$.

For comparison purposes, one gram of commercial ammonia synthesis catalyst particles less than 0.02 cm in diameter was obtained by screening a large sample, nominally of 0.2–0.3 cm size. This was loaded into the same reactor and subjected to similar treatment, except that no alkali was introduced. Measurements made by the BET method yielded a surface area value of 15.8 $m^2/g$. The maximum activity observed for this catalyst was 5.5 vol percent $NH_3$, which was equivalent to a specific activity of only 0.01 liters $NH_3/m^2/hr$. Although the sodium hydride-coated iron catalyst yielded less ammonia than the conventional catalyst, due to its much smaller surface area, the specific activity of the sodium hydride-coated iron catalyst greatly exceeded that of the conventional catalyst by a ratio of 20:1.

EXAMPLE 2

Twenty-five grams of a commercial ammonia synthesis catalyst, Katalco 35-4, were reduced by slowly raising the temperature from 360° to 430° C. over a threeday period in synthesis gas flowing at 1000 cc/min. (STP) at 5 atm pressure. The pressure was then increased to 50 atm and the temperature was increased gradually from 430° to 460° C. over several hours while ammonia production-rate studies were made. A maximum activity of 6.2 vol. percent ammonia was observed, occurring at a temperature of 430° C.

A second experiment was performed in the same way except that the synthesis gas was passed during reduction through a heated pre-treatment chamber containing sodium (as hydride). Sodium was vaporized into the synthesis gas and transferred to the catalyst where it formed a sodium hydroxide coat on the catalyst by reacting with the water vapor produced as a product of the reduction. The temperature of the pre-treatment chamber was maintained below that of the catalyst chamber by about 35° C. at the lower temperatures and up to 50° C. at 430° C., in order to control the amount of sodium hydroxide produced and hence to avoid plugging the catalyst pores with too much sodium hydroxide. The amount of sodium transpired, calculated by Equation (3) and the method described above, was 98 mg. This calculated amount of sodium transpired represents the maximum amount that the catalyst could have acquired, since some could have passed through the catalyst bed. Ammonia production-rates studies were made, and a maximum activity of 7.9 vol. percent ammonia was observed, occurring at a temperature of 430° C. This was an increase of about 25% over the production rate in the absence of transpired sodium.

EXAMPLE 3

Twenty-five grams of a commercial ammonia synthesis catalyst, Katalco 35-4, were reduced in flowing synthesis gas (1000 cc/min. (STP), 1 atm), with no alkali introduction, for one hour each at temperatures of 400°, 450°, 475°, 500°, and 525° C. When reduction was completed, the pressure was increased to 50 atm and flow was continued with the reactor at 450° C. This yielded an activity of 7.0 and 7.2 vol. percent $NH_3$ in two separate runs. The procedure was then repeated, and in this run the synthesis gas was passed through a heated pre-treatment chamber loaded with sodium metal suspended on nickel powder. The amount of sodium transpired during reduction was not calculated in this run because the reaction heat as the sodium was converted to hydride prevented accurate measurement of the sodium temperature early in the experiment. When reduction was completed, the pressure was increased to 50 atm and the flow was continued for two days at 450° C. with the inflowing synthesis gas bypassing the pre-treatment chamber. After the two days, the catalyst activity had stabilized at 7.96 vol. percent $NH_3$. The influent synthesis gas flow rate was about 1160 cc/min. (STP) and the effluent flow was 1000 cc/min. (STP). The stability of the catalyst without further addition of sodium shows that the enhancement of activity obtained by adding sodium during reduction is caused by a stable coat of sodium hydroxide.

EXAMPLE 4

The activity of the catalyst described in Example 3 already enhanced by a sodium hydroxide coat was further enhanced by adding more alkali, as alkali hydride during continued ammonia synthesis. This was accomplished by passing the synthesis gas at 50 atmospheres through the heated pre-treatment chamber, loaded with sodium hydride, before it entered the catalyst chamber so that the stream of gas would transpire additional sodium to form sodium hydride on the surface of the catalyst.

In order to determine the effect of supplying different amounts of sodium hydride by this means and the optimum amount which produced the greatest activity, it was considered that the thickness of the sodium hydride coat would be a function of the fraction of saturation pressure of alkali in the catalyst chamber. Under steady state conditions, the hydride would dissociate and the sodium would be transpired from that chamber at the same rate that it was introduced. It was further considered that the thickness of the alkali coat would depend on the ratio of (a) the alkali metal partial pressure at the temperature in the pre-treatment chamber (where the alkali was vaporized) to (b) the alkali metal partial pressure at the temperature of the catalyst chamber; and that this ratio could be controlled by controlling the relative temperatures. That ratio may be represented as $(P/P^0)_{Na}$ where P is the saturation pressure at the pre-treatment temperature and $P^0$ the saturation pressure at the catalyst chamber temperature. That ratio is referred to as the "reduced partial pressure ratio". In the absence of accurate data on sodium vapor pressure above heated sodium hydride, the assumption was made that the reduced partial pressure ratio of sodium is not affected by the conversion to sodium hydride in the equilibrium reaction which occurs under the experimental conditions. By way of example, and using published values for sodium vapor pressure (Lange's Handbook, 11th Edition, page 10–31), a pre-treatment chamber temperature of 401° C. and a catalyst chamber temperature of 427° C. yield a $(P/P^0)_{Na}$ value of (0.36 mm. Hg./0.70 mm. Hg.) or 0.51.

To investigate the dependence of activity on the reduced partial pressure ratio, the catalyst temperature in the method of this Example was maintained constant at 427° C. and the pre-treatment chamber temperature was varied. The connecting channel between the two chambers was designed to operate at intermediate temperatures, higher than the pretreatment chamber and lower than the reactor chamber. The effluent flow from the catalytic reactor was maintained at 1000 cc/min.

The activity of the catalyst was found to be dependent upon the reduced partial pressure ratio of sodium, as shown in FIG. 1 of the accompanying drawing. In FIG. 1, the production rate in vol. percent of $NH_3$ is plotted against increasing sodium partial pressure ratio $(P/P^0)_{Na}$. The activity increased progressively as the partial pressure ratio increased up to a peak value of 0.55, and continued at substantially the same rate up to a ratio of about 0.6. As the partial pressure ratio was increased above this value, activity began decreasing, and it is assumed that this is because the detrimental effect of pore blockage in the catalyst more than compensated for increased catalytic activity. The experimental results shown at partial pressure ratios much higher than 0.55 do not reflect truly steady-state conditions since it was observed that the activity continued to decrease slowly with time.

Figure 2:
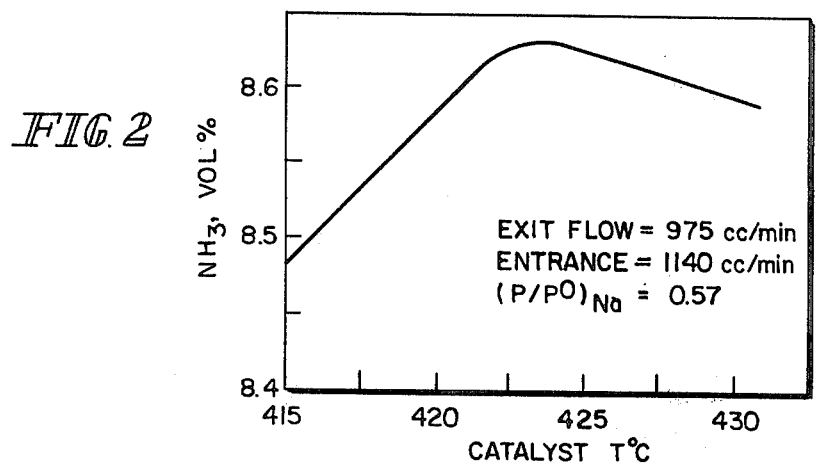
FIG. 2 is a graph showing the results of investigation of the dependence of the reaction on catalyst temperature, in which the production rate is plotted against catalyst temperature.

In further experiments, the influent flow was controlled at 1140 cc/min. and the dependence of the reaction on catalyst temperature was investigated. A maximum activity of over 8.6 vol. percent $NH_3$ was observed at 423° C. This is shown in the accompanying FIG. 2, in which the production rate is plotted against catalyst temperature. The activity observed compared to a maximum activity of about 7.1 vol. percent $NH_3$ obtained with the Katalco 35-4 catalyst, using the same reduction and operating procedures, but with no introduction of alkali, and shows a substantial improvement in catalyst activity.

Figure 3:
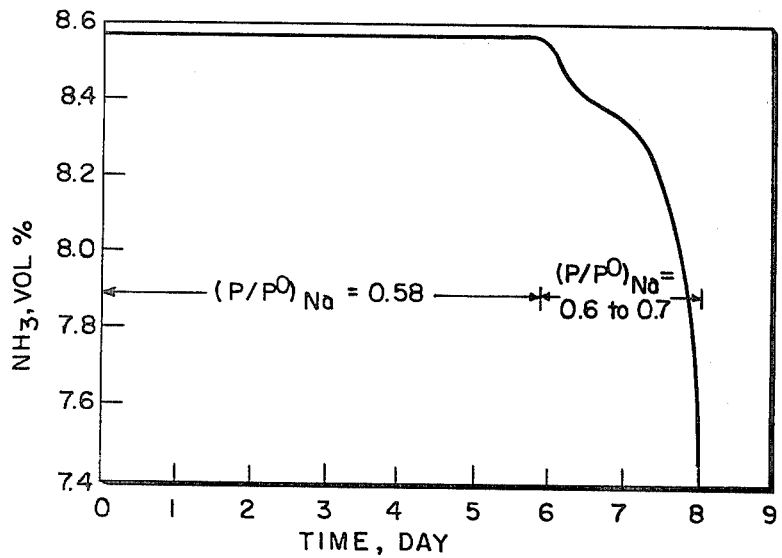
FIG. 3 is a graph showing the results of investigating the effect of using too high a sodium vapor partial pressure ratio and the time dependence of this effect, and in which the production rate is plotted against time.

The deleterious effect of using too high a sodium vapor partial pressure ratio was further investigated and the time dependence of this effect was observed. The results are shown in FIG. 3 in which the production rate is plotted against time. The catalyst activity stayed constant at about 8.6 vol. percent $NH_3$ at a temperature of 425° C. for six days while the reduced sodium partial pressure was maintained at 0.58. After this period, the partial pressure was increased to the range of 0.6 to 0.7 over a two-day study, and the activity decreased continuously.

When the catalyst was removed from the reactor, analysis for sodium by atomic absorption spectroscopy yielded a value of 0.7 wt. percent sodium, substantially above the 0.5 wt. percent which is the preferred maximum.

From the results of this example, it is deemed desirable to use a $(P/P^0)$ ratio not greater than 0.6, and preferably not greater than 0.58. While these results were obtained with sodium, the same desirable and preferred rates apply with other alkali metals, as indicated in Example 4.

EXAMPLE 5

Example 2 is repeated except that potassium is loaded in the pre-treatment chamber instead of sodium. The temperature of the pre-treatment chamber is caused to lag behind that of the catalyst chamber, as the catalyst chamber temperature increases, by the same amounts as in Example 2. Corresponding increases in catalyst activity are obtained.

EXAMPLE 6

The synthesis procedure of Example 4 is repeated except that potassium is loaded in the pre-treatment chamber instead of sodium. Desirable reduced partial pressure ratios are obtained by controlling the temperatures of the catalyst and the pre-treatment chambers, as in Example 4. The desirable ratio is not greater than 0.6 and the preferred ratio is 0.55. The reduced partial pressure ratios are calculated from published potassium vapor pressure data (Lange's Handbook).

EXAMPLE 7

The synthesis procedure of Example 4 is repeated except that sodium is transpired from the sodium pre-treatment chamber in a side stream of nitrogen which is mixed into the synthesis gas before the synthesis gas enters the catalyst chamber. With the combined effluent flow from the catalyst chamber maintained at 1000 cc/min. (STP), the nitrogen flow rate is maintained at 166 cc/min. (STP). This smaller flow of nitrogen transpires as much sodium as does the larger synthesis gas flow in Example 4 because the sodium does not react with hydrogen to form a non-volatile compound, as it does with the synthesis gas. The transpired sodium reacts with hydrogen in the synthesis gas to deposit a coat of sodium hydride on the catalyst surface. Corresponding improvement in catalyst activity is obtained.

EXAMPLE 8

Examples 5 and 6 may be repeated, except that instead of using sodium or potassium as the added alkali, cesium or rubidium is used.

EXAMPLE 9

The synthesis procedure of Example 7 is repeated except that synthesis gas containing 50 parts per million carbon dioxide is used in place of pure synthesis gas. The ammonia concentration in the effluent gas is continually monitored as a thin coat of alkali compounds, considered to be a mixture of hydroxide and carbonate, forms on the catalyst surface. When the ammonia concentration reaches a peak and starts to decrease, the synthesis gas containing carbon dioxide is replaced with pure synthesis gas.

What is claimed is:

1. An improved ammonia synthesis catalyst, consisting of a preformed porous substrate of reduced iron-base catalyst, having large surface area, the surface of which is coated with a vapor-deposited coating of an inorganic alkali metal compound or compounds in an amount measured by weight of the alkali metal, of less than one weight percent of the catalyst weight.

2. The catalyst of claim 1 in which the iron-base substrate contains one or more promoters including an alkali or alkaline earth oxide and the surface area thereof is at least about 5.0 $m^2/g$.

3. The catalyst of claim 1 in which the alkali metal is sodium, potassium, rubidium, or cesium and the inorganic compound is the hydride, hydroxide, or carbonate of such metal.

4. The catalyst of claim 2 in which the coating is of sodium hydroxide or potassium hydroxide.

5. The catalyst of claim 2 in which the coating is of sodium hydride or potassium hydride.

6. The catalyst of claim 2 in which the coating is of sodium carbonate or potassium carbonate.

7. An improved ammonia synthesis catalyst, consisting of a preformed porous substrate of reduced iron-base catalyst, having large surface area of at least about 10 $m^2/g$., the surface of which is coated with a vapor-deposited coating of an inorganic alkali metal compound or compounds in an amount not substantially more than sufficient to produce maximum catalyst activity, wherein the metal is sodium, potassium, rubidium, or cesium and the inorganic compound is the hydride, hydroxide, or carbonate of such metal.

8. The process of making an improved ammonia synthesis catalyst, which comprises
   introducing alkali metal vapor into a carrier gas and passing such gas over an iron-base catalyst,
   reacting the alkali metal vapor with hydrogen, water vapor, or carbon oxide, or mixtures thereof, to form a coating on the surface of the catalyst of alkali metal hydride, hydroxide, or carbonate, or mixtures thereof, and
   controlling the operating conditions to limit the coating of alkali metal compound to an amount, measured by weight of alkali metal therein, of less than one weight percent of the catalyst weight.

9. The process of claim 8 in which carrier gas is a reducing gas and the iron-base catalyst is reduced from an oxide to a metal by passing such reducing gas over the catalyst, and alkali metal is introduced into the reducing gas, is carried thereby to the catalyst, and reacts with water formed in the reduction reaction to form a deposit of alkali metal hydroxide on the surface of the catalyst.

10. The process of claim 9 in which the carrier gas is synthesis gas.

11. The process of claim 10 in which the alkali metal is introduced into the synthesis gas by dissociation from a deposit of alkali metal hydride in a pre-treatment chamber maintained at a temperature sufficient to cause dissociation of the hydride.

12. The process of claim 11 in which the operating conditions are controlled by controlling the temperature of the pre-treatment chamber.

13. The process of claim 8 in which the alkali metal is reacted with water vapor so as to form a coating of alkali metal hydroxide on the catalyst surface.

14. The process of claim 13 in which the carrier gas is a reducing gas passed over the catalyst in the course of reducing the same from an oxide state, the water with which the alkali metal vapor reacts being generated as a product of the reduction reaction.

15. The process of claim 14 in which the reducing gas is synthesis gas.

16. The process of claim 8 in which the alkali metal is vaporized into nitrogen or an inert gas.

17. The process of claim 16 in which the nitrogen or inert gas containing the alkali metal is mixed with synthesis gas and the resulting gas mixture is passed over the catalyst.

18. The process of claim 8 in which the alkali metal vapor is reacted with carbon oxide in the gas to form a coating of alkali metal carbonate on the catalyst.

19. The process of claim 17 in which the alkali metal vapor is reacted with carbon oxide in the synthesis gas to form a coating of alkali metal carbonate on the catalyst.

20. The process of making an improved ammonia synthesis catalyst, which comprises
passing ammonia synthesis gas over an iron-base catalyst under ammonia production conditions,
and introducing alkali metal vapor into the synthesis gas, ahead of the catalyst, so that alkali metal is carried by the gas and reacts with hydrogen therein to form a deposit of alkali metal hydride on the surface of the catalyst to enhance the catalytic activity thereof.

21. The process of claim 20 in which the alkali metal is vaporized into and carried by synthesis gas.

22. The process of claim 20 in which the alkali metal is vaporized into nitrogen or an inert gas which is subsequently mixed with the synthesis gas.

23. The process of claim 20 with the addition of controlling the reduced partial pressure of alkali metal vapor in the synthesis gas to limit the amount of alkali metal hydride deposit, measured by weight of alkali metal therein, to less than one weight percent of the weight of the catalyst.

24. The process of claim 20 with the addition of controlling the reduced partial pressure of alkali metal vapor in the synthesis gas to limit the amount of alkali metal hydride deposit to less than an amount which causes a drop in the rate of ammonia production.

25. The process of claim 20 in which the alkali metal is introduced by passing the synthesis gas through a pre-treatment chamber containing alkali metal hydride before it passes over the catalyst and maintaining the pre-treatment chamber at a temperature sufficient to cause dissociation of the hydride.

26. The process of claim 25 with the addition of maintaining the pre-treatment chamber at a regulated temperature below that of the catalyst chamber so as to control the reduced partial pressure of alkali metal in the catalyst chamber and thereby control the amount of alkali metal hydride deposit to less than an amount which causes a drop in the rate of ammonia production.

27. The process of claim 25 with the addition of maintaining the pre-treatment chamber at a regulated temperature below that of the catalyst chamber so as to control the reduced partial pressure of alkali metal in the catalyst chamber and thereby control the amount of alkali metal hydride deposit, such temperature being so regulated that the ratio $(P/P^0)$ of the vapor pressure $(P)$ of the alkali metal at the temperature of the pre-treatment chamber to the vapor pressure $(P^0)$ of such metal at the temperature of the catalyst chamber is not greater than 0.6.

28. The process of claim 27 in which the alkali metal is sodium or potassium and the relative temperatures are regulated so that such ratio $(P/P^0)$ is in the range of 0.5 to 0.58.

29. The method of improving the activity of an iron-base ammonia synthesis catalyst in a synthesis process in which synthesis gas is passed over the iron-base catalyst at elevated temperature and pressure synthesis-reaction conditions, which comprises continuously vaporizing an alkali metal or compound thereof into the synthesis gas ahead of the catalyst so as to carry alkali to the surface of the catalyst.

30. The method of claim 29 with the addition of controlling the vaporization temperature at less than the catalyst temperature so as to maintain a supply rate of alkali less than the potential discharge rate thereof by the catalyst, and thereby avoid overloading the catalyst.

31. The method of claim 30 in which the relative temperatures are so maintained that the ratio $(P/P^0)$ of vapor pressure $(P)$ of the metal at the vaporization temperature to the vapor pressure $(P^0)$ of the metal at the catalyst temperature is not greater than 0.6.

32. The method of claim 31 in which the alkali metal used is sodium or potassium and the ratio and the partial pressure of the metal, $(P/P^0)$, is maintained at a value not greater than about 0.58.

33. An improved ammonia synthesis catalyst is in any of claims 1 through 7 in which the coating of inorganic alkali metal compound is in an amount, measured by weight of the alkali metal, of not more than 0.6 weight percent of the catalyst weight.

34. The process of any of claims 8 through 19 in which the operating conditions are controlled to limit the coating of alkali metal compound, measured by weight of alkali metal therein, to not more than 0.6 weight percent of the catalyst weight.

* * * * *

UNITED STATES PATENT AND TRADEMARK OFFICE
CERTIFICATE OF CORRECTION

PATENT NO. : 4,235,749

DATED : November 25, 1980

INVENTOR(S) : Theodore A. Gens

It is certified that error appears in the above-identified patent and that said Letters Patent are hereby corrected as shown below:

In the Abstract, line 9, change "a inorganic" to --an inorganic--.

Column 6, line 17, change "drops" to --drop--.

Column 8, line 68, change "compared" to --compares--.

Column 12, line 49 (Claim 33, line 1), change "is" to --as--.

Signed and Sealed this

Twenty-eighth Day of April 1981

[SEAL]

*Attest:*

RENE D. TEGTMEYER

*Attesting Officer*     *Acting Commissioner of Patents and Trademarks*